United States Patent
Ellero et al.

(10) Patent No.: US 6,899,125 B2
(45) Date of Patent: May 31, 2005

(54) FLOW-ADJUSTING DEVICE FOR A LIQUID, IN PARTICULAR A PAINTING PRODUCT

(75) Inventors: Dario Ellero, Arese (IT); Gianmarco Vercellis, Cinisello Balsamo (IT); Angelo Basso, Castelletto d'Orba (IT)

(73) Assignee: Wagner Colora S.R.L., Milan (IT)

( * ) Notice: Subject to any disclaimer, the term of this patent is extended or adjusted under 35 U.S.C. 154(b) by 63 days.

(21) Appl. No.: 10/319,465

(22) Filed: Dec. 16, 2002

(65) Prior Publication Data

US 2003/0164190 A1 Sep. 4, 2003

(30) Foreign Application Priority Data

Mar. 1, 2002 (EP) .............................................. 02425115

(51) Int. Cl.⁷ ............................................... G05D 16/02
(52) U.S. Cl. .................... 137/505.42; 137/549
(58) Field of Search ........................... 137/505, 505.42, 137/549

(56) References Cited

U.S. PATENT DOCUMENTS

| | | | | |
|---|---|---|---|---|
| 2,595,156 A | * | 4/1952 | Matasovic | 137/505.42 |
| 2,612,728 A | * | 10/1952 | Jacobsson | 137/505.42 |
| 3,189,041 A | | 6/1965 | Hansen | |
| 3,621,867 A | * | 11/1971 | Johnson | 137/505.18 |
| 4,171,004 A | | 10/1979 | Cerrato et al. | |
| 5,139,046 A | * | 8/1992 | Galli | 137/505.42 |

FOREIGN PATENT DOCUMENTS

| | | |
|---|---|---|
| GB | 871133 | 6/1961 |
| GB | 1145196 | 3/1969 |

* cited by examiner

*Primary Examiner*—Stephen M. Hepperle
(74) *Attorney, Agent, or Firm*—Browdy and Neimark, P.L.L.C.

(57) ABSTRACT

The flow-adjusting device comprises: a housing (2) having an inlet channel (4) and an outlet channel (5) to be connected with respective pipes (6) through which a liquid is caused to flow, a closure assembly (7) arranged in the housing (2) between the inlet and outlet channels (4, 5) for drivingly adjusting the flow of the liquid, and a deformable diaphragm (3), deformation of which takes place in proportion to the liquid pressure in the outlet channel (5) and which is active on the closure assembly (7). The device also comprises a hollow body (15) internally bounding a storage chamber (16) disposed between the inlet and the outlet channels (4, 5), the storage chamber (16) having a lower portion (16a) to be engaged by the liquid and an upper portion (16b) defining an air-tight region wherein air under pressure is stored under the effect of increasing pressure of the liquid and causes recirculation of the liquid on decreasing of the liquid pressure.

9 Claims, 4 Drawing Sheets

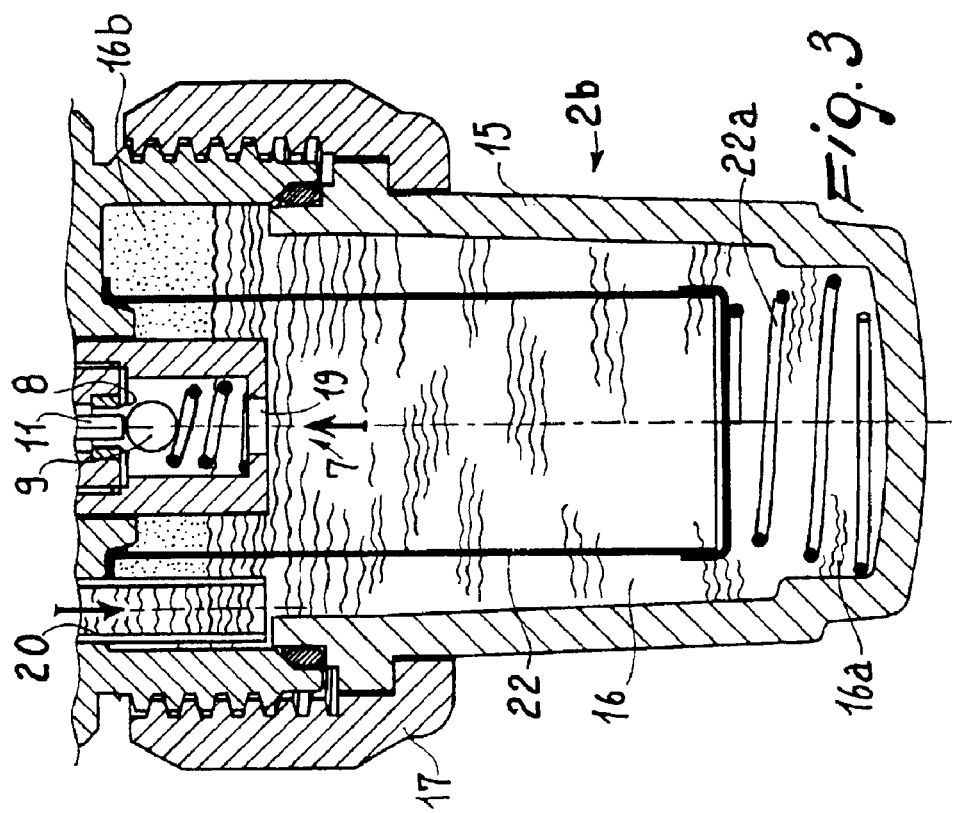
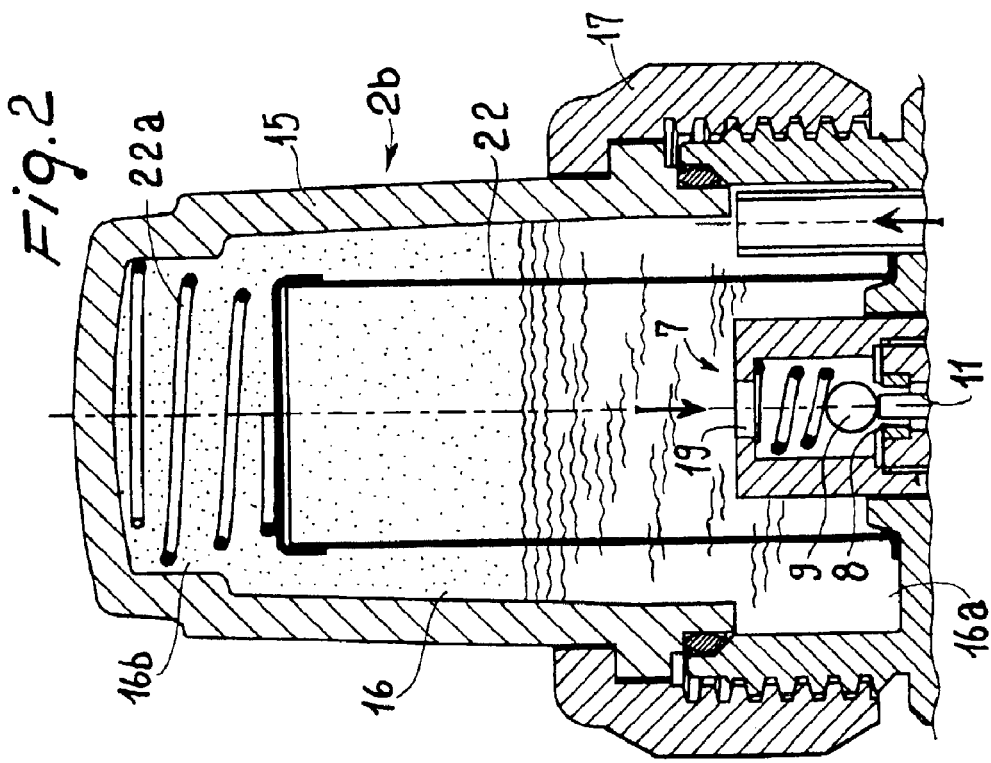

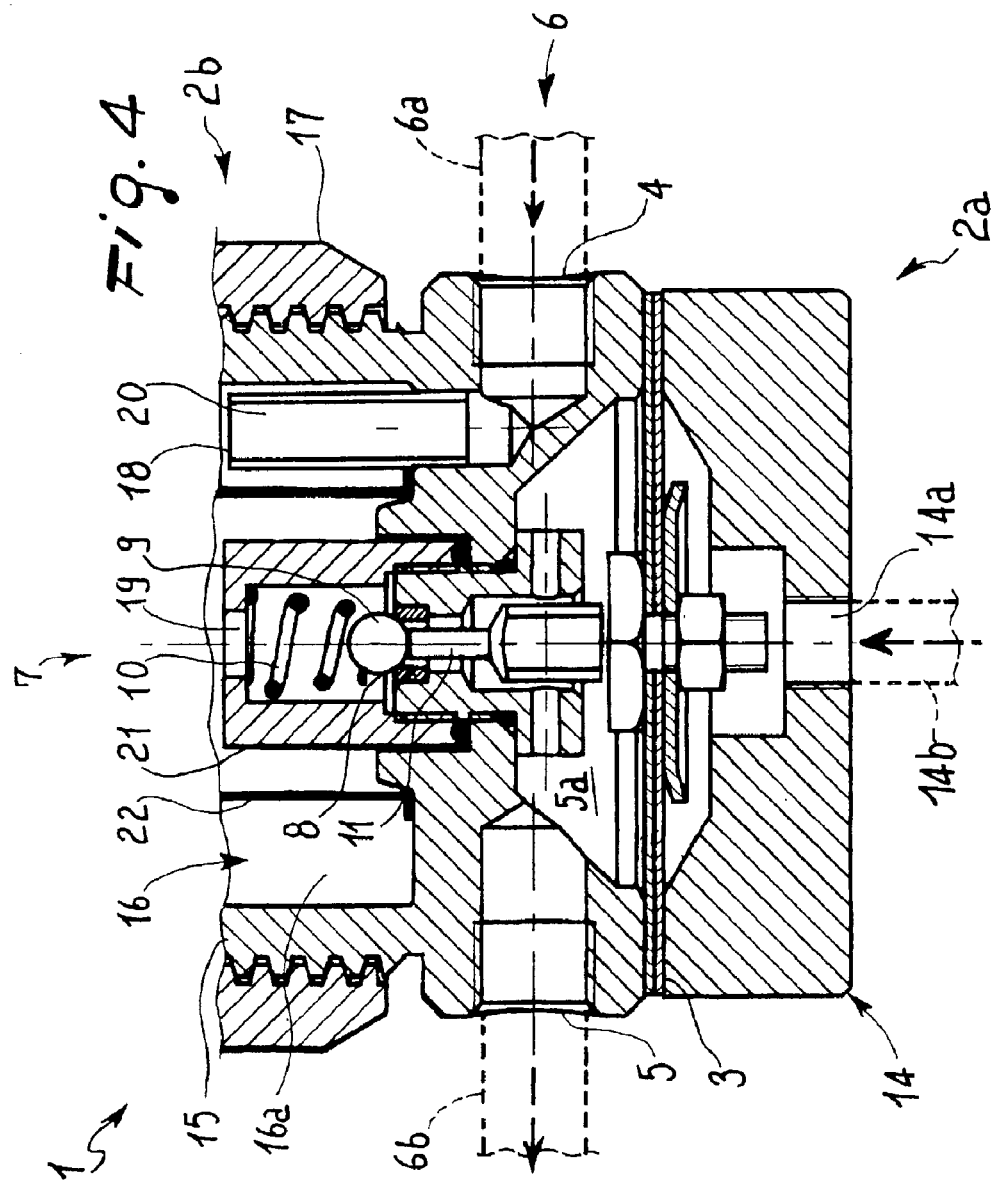

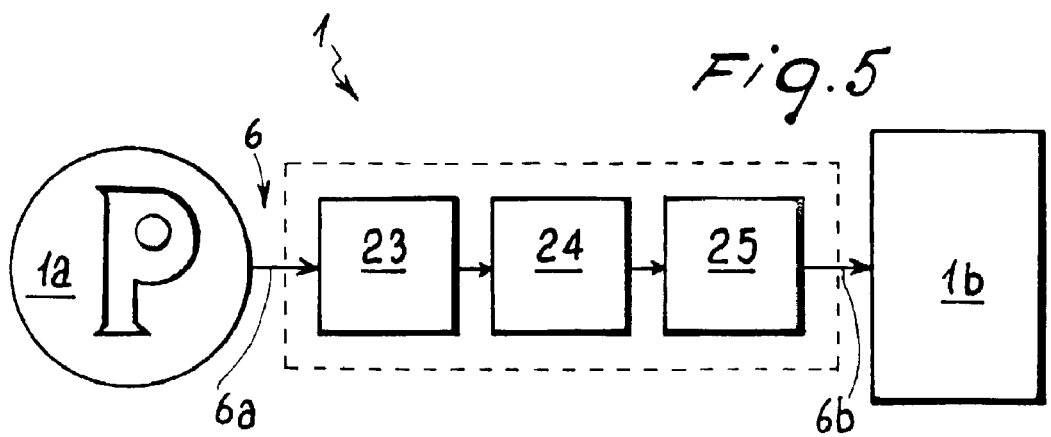
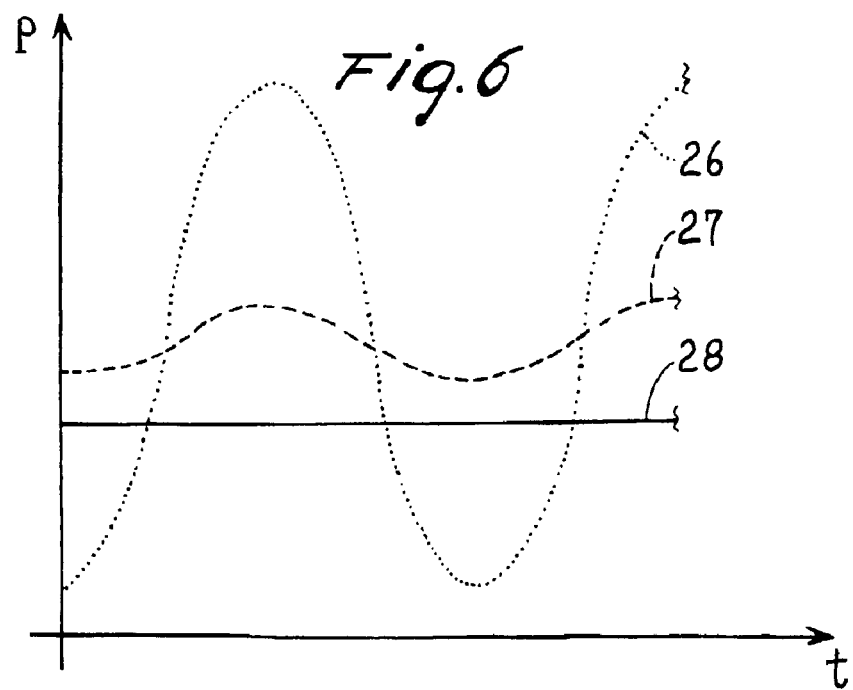

FLOW-ADJUSTING DEVICE FOR A LIQUID, IN PARTICULAR A PAINTING PRODUCT

FIELD OF THE INVENTION

The invention relates to a flow-adjusting device for a liquid, in particular a painting product such as a paint or an enamel flowing along a pipe.

It is known that flowing of a liquid along a pipe may require different adjustments and interventions to conform the same to the users' requirements for example, or the requirements of the apparatus disposed downstream of the pipes.

For instance, painting plants for correct operation require that the painting product should be supplied at a substantially uniform pressure which in addition must be conveniently calibrated, as regards its level, depending on the features of the sprayers or nozzles placed at the end of the dispensing pipes.

These conditions are often in contrast with the operating features of the pumping apparatus and the machines set upstream of the pipes.

For instance, if the pumping apparatus consist of reciprocating positive-displacement pumps, feeding of the painting liquid or product is subjected to sudden changes of pressure, in synchronism with the steps of the pump's work cycle. Furthermore pressure, as regards its average level, depends not only on the characteristics of the dispensing end apparatus, but also on those of the pumping devices.

Said irregularities may be unacceptable in many cases, in particular when malfunctions in the dispensing apparatus may be caused and when exactly predetermined and uniform amounts of painting products are to be dispensed through sprayers or other devices, in order to avoid unsatisfactory results from a qualitative point of view.

DESCRIPTION OF THE PRIOR ART

To compensate for and overcome said flow irregularities in a liquid, above all a painting product, usually different apparatus are applied along the guiding or delivery pipes or ducts. These apparatus may consist of pressure reducers and oscillation-leveling members.

In particular, pressure reducers are set to intervene on the pressure level of the liquids before the latter reach the dispensing points, consisting for example of spray guns provided with nozzles, operation of which directly depends on the feed pressure.

Pressure reducers are relatively complicated members and have a housing including a deformable diaphragm dividing the housing itself into a control portion which is substantially dry and an operating portion through which the liquid flows. The operating portion comprises a liquid inlet channel and a liquid outlet channel, and a closure assembly is inserted between said inlet and outlet to modulate or prevent passage of the liquid depending on the deformation of said deformable diaphragm.

Deformation of said diaphragm takes place proportionally of the pressure to be adjusted, i.e. of the pressure of the outgoing liquid: if the pressure difference between the incoming liquid and the outgoing liquid exceeds a given level, the deformable diaphragm deforms to such a point that opening of the closure assembly is operated, to enable circulation of the liquid.

When the closure assembly includes a ball that tendentially occupies a place in abutment against a gauged mouth through which the liquid flows, operation of the deformable diaphragm takes place and, if the diaphragm is deformed, it moves the ball away from the gauged mouth enabling the liquid to flow. To control the diaphragm action, said diaphragm is typically engaged by a spring. The spring is disposed in said control portion of the pressure reducer, between the diaphragm itself and an appropriate adjusting element. Generally the adjusting element is a screw jutting out of the reducer housing so that it can be screwed down at will, therefore giving rise to a greater or smaller pressure exerted by the spring on the diaphragm. The more pressure of the spring on the diaphragm is increased, the easier the diaphragm deformation, so that the closure assembly is opened letting the liquid under pressure pass therethrough. Typically, these pressure reducers are mounted with said control portion, in a dry condition, placed at an upper position and said operating portion at an underlying position. Clearly the above aims at enabling comfortable operation of the adjusting screw element, even if it is done manually.

In addition, in this position the liquid under pressure enters the closure assembly which is relatively close to the deformable diaphragm controlling it, and typically flows downwardly. As a result, possible impurities or clots in the liquid do not cause clogging of the closure member but spontaneously settle down at the bottom of the pressure reducer.

This is an important feature above all in the case of liquids embodied by painting products, since any deposit or clot at the ball and the gauged mouth of the closure assembly immediately gives rise to malfunction of the pressure reducer. In painting plants in particular, in addition to pressure reducers, also provided are the so-called oscillation-leveling members, having the specific function of leveling to a substantially uniform and constant value, pressures following each other in an irregular or recurring manner, in the presence of pumping apparatus consisting of reciprocating pumps, piston pumps or at all events positive-displacement pumps, for example.

The oscillation-leveling members comprise a housing internally bounding a storage chamber inserted along the liquid delivery pipes. In the presence of an excess delivery or pressure said chamber tends to become filled with liquid compressing the air present therein in a bag placed at an end of the chamber itself. Thus at least part of the dispensed excess is absorbed.

On the contrary, when there is a lack in supply, the liquid stored in the storage chamber tends to flow in the delivery pipes again by effect of the pressure of the air confined in said bag.

Other apparatus that can be provided along the pipes or ducts guiding the liquid, a painting product for example, are filtering members of various configurations. The described apparatus have some drawbacks.

A first important drawback is connected with the costs inherent in all these apparatus. Costs result both from the intrinsic economic value of the pressure reducers, the oscillation-leveling members and filtering members, and from the requirement of inserting them in the pipes at various points thereof with distinct intervening applications and a wide use of various pipe fittings.

Other drawbacks result from the possibility, in case of unskilled staff, of disposing the apparatus in an incorrect manner as regards mutual positioning along the liquid flow and above all the possibility of mounting apparatus correlated with each other in a wrong way in terms of capacity, functional parameters or type of connections.

A dispensing plant for liquids or painting products requiring application of several apparatus, along each delivery pipe, is then surely bulky. In particular pipes of reduced length are impossible to be provided because each apparatus needs an important pipe section for engagement.

Further important drawbacks typical of use of several apparatus in a plant for dispensing painting products are connected with some waste of expensive materials and the polluting problems that could result therefrom. In fact, in each apparatus there is an accumulation of painting products that are not dispensed, stored at dead angles of the apparatus or adhering to the apparatus surfaces for example.

If there is a relatively great number of accumulation regions and if these regions must be frequently cleaned, because the color of the painting products is to be often changed for example, an important waste of materials takes place. This waste may give rise to a negative environmental impact, since polluting products are easily involved.

Possible pollution can then be potentially worsened by use of solvents for cleaning said apparatus and the bigger the number of these apparatus is, the more intense the use of solvents.

The polluting problems can be overcome by adopting appropriate procedures but the same involve further costs.

SUMMARY OF THE INVENTION

Under this situation the technical problem to be solved by the present invention is to provide a flow-adjusting device capable of obviating said drawbacks, in particular in case of use of liquids embodied by painting products.

The technical problem is solved by a flow-adjusting device for a liquid, in particular a painting product, comprising: a housing having an inlet channel and an outlet channel for connection with respective pipes, a closure assembly arranged in said housing between said inlet and said outlet channel for drivingly adjusting a liquid flow through the device, and a deformable diaphragm inserted in said housing, said diaphragm being deformable in proportion to a pressure of the liquid in said outlet channel and acting on said closure assembly, wherein said housing comprises a hollow body internally bounding a storage chamber arranged between said inlet channel and said closure assembly, said storage chamber having a lower portion to be engaged by the liquid and an upper portion defining an air-tight region within said storage chamber for storing air under pressure engaging the liquid in said lower portion.

BRIEF DESCRIPTION OF THE DRAWINGS

Further features and advantages of the invention will become apparent from the detailed description of an adjusting device in accordance with the invention, with reference to the drawings, in which:

FIG. 2 shows an upper portion of the device in FIG. 1, in a different operating step;

FIG. 3 shows the same portion as in FIG. 2 in a reversed position and during the same operating step as shown in FIG. 2;

FIG. 4 shows another embodiment of the lower portion seen in FIG. 1;

FIG. 5 diagrammatically shows a plant including members having the operational features of the device in FIG. 1; and FIG. 6 shows how the flow of a liquid varies along a pipe fed from a reciprocating pump and controlled by the device in accordance with the invention.

Description of Preferred Embodiments

Figure 1:
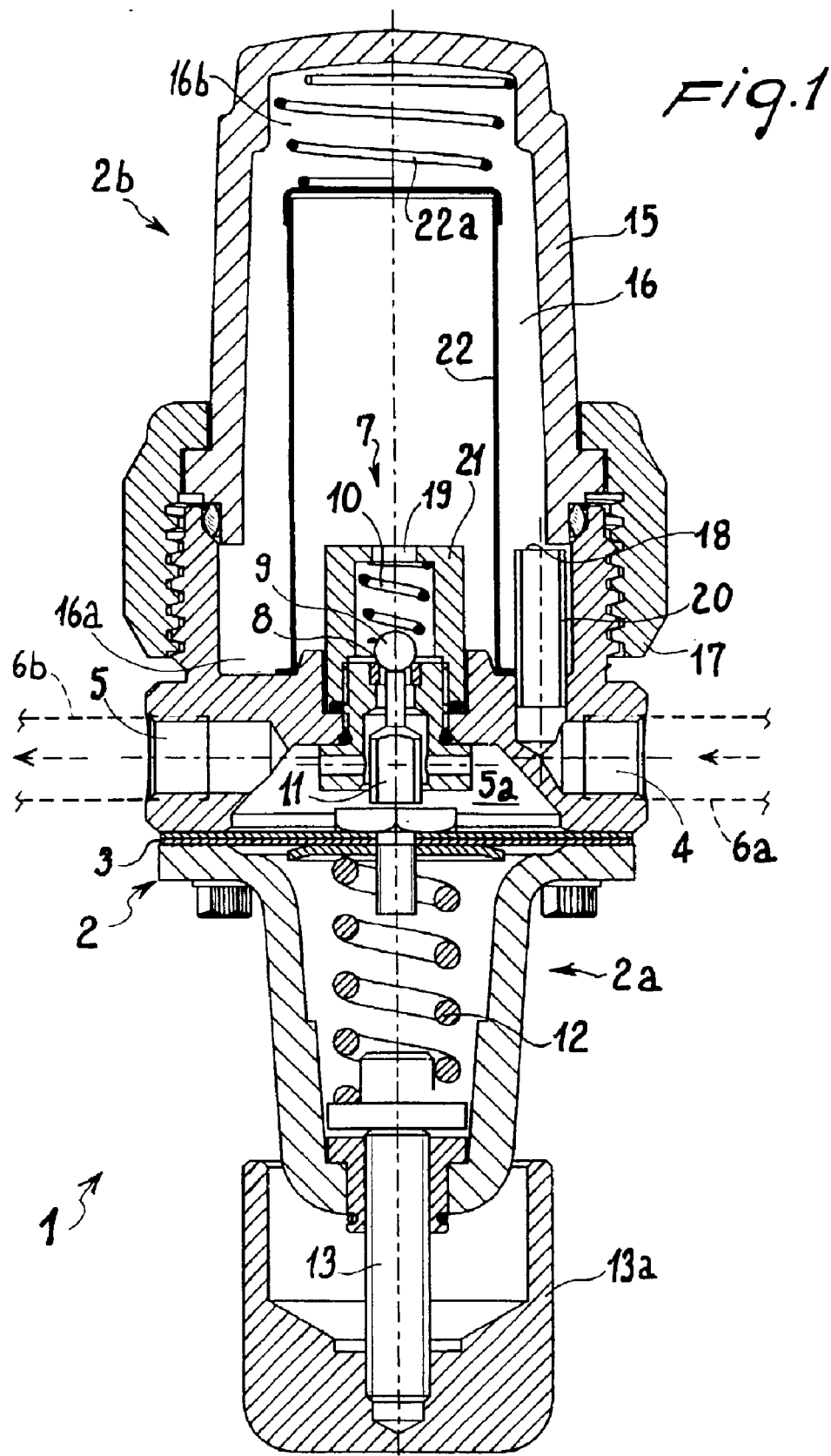
FIG. 1 is a cross-sectional view of an adjusting device in accordance with the invention, taken as a whole.

With reference to the drawings, the device in accordance with the invention is generally denoted at 1.

It is provided for insertion in a plant diagrammatically shown in FIG. 5 and comprising at least one pump 1a fed for example with painting products, and end elements 1b such as spray guns for example, disposed upstream and downstream of the device 1 itself, respectively.

Device 1 comprises an outer housing 2 substantially divided into two portions: a control portion 2a which is substantially dry, and an operating portion 2b in which the liquid flows.

Housing 2 is of plastic or metal material, aluminum or stainless steel for example, depending on the requirements of the plant in which device 1 is to be inserted. The operating portion 2b is separated from the control portion 2a by a deformable diaphragm 3.

The operating portion 2b has an inlet channel 4 and an outlet channel 5 which, through pipe fittings known per se, are inserted in a water-tight manner between a first and a second section 6a and 6b of a pipe 6, extending upstream and downstream of housing 2, respectively.

A closure assembly 7 adapted to drivingly adjust the flow of a liquid is inserted between the inlet and outlet channels, 4 and 5 respectively.

In particular, in the embodiment shown, the closure assembly 7 has a circular valve seat in a form of a gauged mouth 8 on which valve member abuts, being sealingly in engagement therewith; the valve member is embodied by a ball 9 of a greater diameter than that of the gauged mouth 8. Ball 9 is urged against the gauged mouth 8 by an auxiliary spring 10. The gauged mouth 8 is in communication, in the direction of the liquid flow, with an expanded section 5a of the outlet channel 5, directly in contact with the deformable diaphragm 3.

Ball 9 is operated by the deformable diaphragm 3 through a strut 11 that on one side thereof faces the ball 9 and on the opposite side is engaged by the deformable diaphragm 3 abutting thereon, and more specifically by a disk rigidly connected in the middle to the diaphragm itself.

Deformation of the deformable diaphragm 3 takes place in proportion to the liquid pressure to be adjusted, i.e. the pressure of the outgoing liquid present in the expanded section 5a of the outlet channel 5, and if the pressure difference between the incoming liquid and the outgoing liquid exceeds a given level, the deformable diaphragm 3 deforms to the extent of moving ball 9 away from the gauged mouth 8, through strut 11, thus enabling flow of the liquid.

The control portion 2a regulates the action of the deformable diaphragm 3 and in the case shown in FIG. 1 includes an adjusting spring 12 directly acting on diaphragm 3.

The spring 12 is a compression spring sandwiched between the diaphragm 3 itself and an adjusting device 13.

The adjusting device 13 can be a mere adjusting screw for example, as shown in FIG. 1.

Device 13 juts out of housing 2 so that it can be screwed at will, through a cap 13a, thereby creating a greater or smaller pressure of spring 12 on the deformable diaphragm 3.

The more pressure of the adjusting spring 12 on the deformable diaphragm 3 is increased, the more deformation of the diaphragm takes place easily so as to open the closure assembly 7.

The control portion 2a can be configured in a different manner; it can take the structure shown in FIG. 4, for example.

In said embodiment, the adjusting spring 12, adjusting device 13 and cap 13a are replaced with an actuator 14 providing a pneumatic signal as represented in FIG. 4.

The actuator 14 comprises a block directly in engagement with the deformable diaphragm 3 and provided with an inner cavity 14a to which compressed air is conveyed through a tube 14b.

The greater or smaller pressure of the compressed air causes a deformation to a greater or smaller degree of the diaphragm 3 in the displacement direction of the strut 11 and ball 9.

As viewed from FIGS. 1 to 3, housing 2 comprises, on the side of the operating portion 2b, a hollow body 15 internally bounding a storage chamber 16 having a lower portion 16a to be engaged by the liquid and an upper portion 16b defining an air-tight region.

The position of the upper portion 16b of the storage chamber 16 with respect to the hollow body 15 depends on the position of housing 2 and is at all events that where accumulation of air takes place, whereas the lower portion 16a is that where there is accumulation of the liquid which is heavier than air.

The storage chamber 16 is placed between the inlet channel 4 and closure assembly 7, whereas the hollow body 15 bounding the chamber is preferably embodied by a bell-shaped body removably and sealingly in engagement with the remaining portions of housing 2.

Preferably, the bell-shaped body is retained by a mere ring nut 17 to be screwed down externally.

Housed internally of the hollow body 15 is a feed mouth 18 formed at the end of the inlet channel 4 and adapted to supply liquid to the storage chamber 16.

In addition, the hollow body 15 internally houses an outlet mouthpiece 19 through which the liquid stored in the storage chamber 16 flows towards the outlet channel 5. The outlet mouthpiece 19 is in fact formed at the closure assembly 7 and upstream of the gauged mouth 8, i.e. the outlet mouthpiece 19 is spaced apart from the valve seat of gauged mouth 8 of the closure assembly 7, as shown in the drawings.

The feed mouth 18 and outlet mouthpiece 19 are both spaced apart from the upper portion 16b of the storage chamber 16, and preferably they both substantially have the same distance from said upper portion 16b.

Preferably the feed mouth 18 and outlet mouthpiece 19 are then both spaced apart from the lower portion 16a of the storage chamber 16 in such a manner as to enable formation of a particle-collecting bottom adapted to collect the heavier particles and prevent the same from laying down at the gauged mouth 8. According to a preferred embodiment of the invention, particularly highlighted in FIG. 3, the feed mouth 18 and outlet mouthpiece 19 are placed at a substantially intermediate region between the lower portion 16a and the upper portion 16b to enable overturning of device 1 without substantially varying the operational character of the latter.

From a structural point of view, the inlet channel 4 is provided to have a final section defined by a tube 20 inserted over a large section thereof into the storage chamber 16 and terminating therein with the feed mouth 18. Preferably tube 20 is removably in engagement with housing 2 so that it can be easily connected and disconnected, and set to have the most appropriate length. The closure assembly 7 is then provided to be externally defined by a tubular element 21 surrounding the gauged mouth 8 and extending in the storage chamber 16, and having said outlet mouthpiece 19 at an end thereof spaced apart from the gauged mouth 8.

The tubular element 21 is a glass or cup-shaped element and is substantially sealingly fastened to housing 2 at the gauged mouth 8. Therefore, the liquid must flow through the outlet mouthpiece 19 so as to be able to reach the gauged mouth 8.

According to an advantageous embodiment of the invention, in the storage chamber 16 between the inlet channel 4 and closure assembly 7, a filtering element 22 is arranged which is preferably defined by a basket-shaped filter substantially surrounding the closure assembly 7 and disposed in external side by side relationship with the inlet channel 4, and more specifically with tube 20. The filtering element 22 is held in place by a spring element 22a and is spaced apart from the walls of the hollow body 15 and also the inlet channel 4 and tube 20 in a manner adapted to enable formation of a particle-collecting bottom (for those particles remained at the outside of the filter) which is not directly impinged on by the liquid flow and which is disposed at the lower portion 16a of the storage chamber 16.

It is to be noted that device 1 is represented as a function chart in FIG. 5 where boxes 23, 24, 25 point out the functions of the filter, oscillation-levelling member and pressure reducer, respectively.

Finally, in FIG. 6 it is diagrammatically shown, in a Cartesian-coordinate system having pressure on the y-axis and time on the x-axis, how said functional features of device 1 have an influence on the liquid flow along pipe 6 in which the device itself is inserted, between the first section 6a and second section 6b. Initially pressure in the first section 6a has a course as reproduced just as an indication with line 26 and in the second section 6b, passing through the course shown by line 27, it becomes substantially constant, as shown in the diagram by line 28.

Operation of device 1 is as follows.

In a single device 1, three distinct functions are accomplished, i.e. that of filter 23, oscillation-leveling member 24 and pressure reducer 25 (FIG. 5). Practically, in device 1 the filter is defined by the filtering element 22, the oscillation-leveling member is defined by the storage chamber 16 and the structure of the hollow body 15 and of the channels opening thereinto, and the pressure reducer is defined by the closure assembly 7 and the structure of housing 2 at the diaphragm 3 and at its control portion 2a.

In more detail, the device initially receives and filters a flow of a liquid, in particular a painting product circulated by pump 1a, that can also have a greatly discontinuous pressure in time, as shown by line 26 in FIG. 6.

The liquid enters the hollow body 15 through the inlet channel 4 and immediately encounters the filtering element 22 preventing passage of the particles and clots present in the liquid itself, towards the outlet channel 5. These residues can lay down on the filtering element 22 or stay at the outside of same.

In the first case after a certain period of time cleaning of the filter is required, which operation can be easily executed by opening the hollow body 15 through untightening of the ring nut 17 for example.

In the second case, residues easily settle at the lower portion 16a of the storage chamber 16 where a region not directly impinged on by the liquid flow is preferably provided so that said residues are not circulated again.

In fact it is to be pointed out that the feed mouth 18 and outlet mouthpiece 19 are at all events at a raised position with respect to the bottom of the storage chamber 16 due to tube 20 and the tubular element 21, irrespective of the position of said chamber, upright as in FIGS. 1 and 2 or overturned as in FIG. 3. Subsequently, pressure discontinuities are greatly reduced due to the storage chamber 16, so that they take a limited variability as diagrammatically shown with line 27.

The storage chamber 16 has very wide sizes so as to collect the liquid surplus that is then recirculated even in the presence of a reduced pressure in the first section 6a of pipe 6, upstream.

This takes place due to the fact that the upper portion 16b of the storage chamber 16 is air-tight, and to the fact that partial filling of the chamber 16 with the excess liquid causes compression of the air in the upper portion 16b. This air under pressure tends to cause recirculation of the liquid even in the absence of external pressure.

The phenomenon is advantageously independent of the position, upright or reversed, of the storage chamber, as shown in FIGS. 2 and 3.

Freedom from position is also obtained due to tube 20 and the tubular or glass or cup-shaped element 21 causing arrangement of the feed mouth 18 and outlet mouthpiece 19 deeply within the storage chamber 16.

Finally the liquid is conveyed to the end or use elements 1b with a substantially constant pressure, as shown by line 28 in FIG. 6. This result is achieved by the deformable diaphragm 3 and closure assembly 7, as previously described.

It should be appreciated that also in the position shown in FIGS. 1 and 2, with the storage chamber 16 raised and the closure assembly 7 fed from the top, the gauged mouth 8 is not damaged by the presence of residues due both to the presence of the filtering element 22 and the raised position of the outlet mouthpiece 19 which at all events is at the outside of every residue-accumulation region.

The invention achieves important advantages.

In fact all drawbacks of the prior art mentioned in the introductory part have been overcome and a device has been conceived that, while consisting of a single unit, is capable of efficiently operating as oscillation-leveling element, pressure reducer and filter.

Due to the particular technical solutions envisaged, the device can be disposed both upright (as in FIGS. 1 and 2) and overturned (as in FIG. 3) and can correctly operate in both cases.

In the preferred position shown in FIG. 1 the storage chamber 16 is fed from below so that an immediate and great efficiency against pressure oscillations is obtained and at the same time the closure assembly 7, although fed from the top, is greatly reliable and is not subjected to clogging due to the presence of impurities in the liquid.

The device has a lower cost than the sum of the costs of the different apparatus previously required, can be easily installed with few mounting operations and minimum use of pipe fittings and is not very bulky along the pipes.

In addition the device is error-proof as regards installation due both to said possibility of being mounted in an overturned position, and to the fact that with its use an erroneous application to a pipe of apparatus that are not operatively homogeneous with each other is no longer possible, and also the correct sequence of the apparatus with respect to the direction of the liquid flow cannot be altered.

Therefore the device is also more reliable as compared with the prior art solutions.

Furthermore, the device of the invention enables the amount of painting products accumulated and not dispensed along the extension line of the plant to be drastically reduced and the necessary cleaning operations to be made quicker and less polluting.

The device can be variously structured and also equipped with several different auxiliary elements, such as elements for drainage and removal of the material placed at the bottom portions.

What is claimed is:

1. A flow-adjusting device for a liquid, in particular a painting product, comprising: a housing (2) having an inlet channel (4) and an outlet channel (5) for connection with a respective pipe (6), a closure assembly (7) arranged in said housing (2) between said inlet and said outlet channel (4, 5) for drivingly adjusting a liquid flow through the device, and a deformable diaphragm (3) inserted in said housing (2), said diaphragm (3) being deformable in proportion to a pressure of the liquid in said outlet channel (5) and acting on said closure assembly (7), wherein said housing (2) comprises a hollow body (15) internally bounding a storage chamber (16) arranged between said inlet channel (4) and said closure assembly (7), said storage chamber (16) having a lower portion (16a) to be engaged by the liquid and an upper portion (16b) defining an air-tight region within said storage chamber (16) for storing air under pressure engaging the liquid in said lower portion (16a), wherein said hollow body (15) internally houses a feed mouth (18), formed at an end of said inlet channel (4), an outlet mouthpiece (19), formed at said closure assembly (7), and wherein said feed mouth (18) and said outlet mouthpiece (19) are both spaced apart from said upper portion (16b) of said storage chamber (16), and wherein said feed mouth (18) and said outlet mouthpiece (19) are arranged both substantially at a same distance from said upper portion (16b); and wherein said inlet channel (4) has at least one final section defined by a tube (20) inserted in said storage chamber (16).

2. A flow-adjusting device as claimed in claim 1, wherein said tube (20) is removably connected with said housing (2).

3. A flow-adjusting device for a liquid, in particular a painting product, comprising: a housing (2) having an inlet channel (4) and an outlet channel (5) for connection with a respective pipe (6), a closure assembly (7) arranged in said housing (2) between said inlet and said outlet channel (4, 5) and having a valve seat and a valve member for drivingly adjusting a liquid flow through the device, and a deformable diaphragm (3) inserted in said housing (2), said diaphragm (3) being deformable in proportion to a pressure of the liquid in said outlet channel (5) and acting on said closure assembly (7), wherein said housing (2) comprises a hollow body (15) internally bounding a storage chamber (16) arranged between said inlet channel (4) and said closure assembly (7), said storage chamber (16) having a lower portion (16a) to be engaged by the liquid and an upper portion (16b) defining an air-tight region within said storage chamber (16) for storing air under pressure engaging the liquid in said lower portion (16a), and wherein said hollow body (15) internally houses a feed mouth (18) located at an end of said inlet channel (4), and an outlet mouthpiece (19) located at said closure assembly (7), said feed mouth (18) and said outlet mouthpiece (19) being both spaced apart from said upper portion (16b) and from said lower portion (16a) of said storage chamber (16), said outlet mouthpiece (19) being spaced apart from said valve seat of said closure assembly (7), and wherein said inlet channel (4) has at least one final section defined by a tube (20) inserted in said storage chamber (16).

4. A flow-adjusting device as claimed claim 3, wherein said feed mouth (18) and said outlet mouthpiece (19) are arranged both substantially at a same distance from said upper portion (16b).

5. A flow-adjusting device as claimed in claim 3, wherein said tube (20) is removably connected with said housing (2).

6. A flow-adjusting device as claimed in claim 3, wherein said closure assembly (7) comprises: a gauged mouth (8) defining said valve seat, a tubular element (21) surrounding said gauged mouth (8) and extending in said storage chamber (16), said outlet mouthpiece (19) being formed at one end of said tubular element (21) disposed spaced apart from said gauged mouth (8).

7. A flow-adjusting device as claimed in claim 6, wherein said tubular element (21) is a cup-shaped element substantially sealingly in engagement with said housing (2) close to said gauged mouth (8).

8. A flow-adjusting device as claimed in claim 3, wherein said hollow body (15) is a substantially bell-shaped body sealingly and removably engaged with said housing (2).

9. A flow-adjusting device as claimed in claim 3, further comprising a filtering element (22) arranged in said storage chamber (16) between said inlet channel (4) and said closure assembly (7), said filtering element (22) being spaced apart from said hollow body (15) and surrounding said closure assembly (7) between said feed mouth (18) and said outlet mouthpiece (19) to form a particle-collecting bottom externally of said filtering element (22) at said lower portion (16a) of said storage chamber (16).

* * * * *